United States Patent
Marchesini

(10) Patent No.: US 6,296,106 B1
(45) Date of Patent: Oct. 2, 2001

(54) SCREW CONVEYOR FOR LOOSE MATERIALS

(75) Inventor: Vainer Marchesini, San Prospero Sulla Secchia (IT)

(73) Assignee: WAM S.p.A., Ponte Motta Cavezzo (IT)

( * ) Notice: Subject to any disclaimer, the term of this patent is extended or adjusted under 35 U.S.C. 154(b) by 0 days.

(21) Appl. No.: 09/441,998

(22) Filed: Nov. 18, 1999

(30) Foreign Application Priority Data

Feb. 5, 1999 (EP) .................................................. 99830064

(51) Int. Cl.[7] ............................ B65G 29/00; B65G 37/00
(52) U.S. Cl. ............................................. 198/608; 198/518
(58) Field of Search .................................. 198/518, 608, 198/671

(56) References Cited

U.S. PATENT DOCUMENTS

| | | | | |
|---|---|---|---|---|
| 2,630,905 | * | 3/1953 | Philipp | 198/518 |
| 4,334,818 | | 6/1982 | Tingskog . | |
| 4,467,910 | * | 8/1984 | Siwersson et al. | 198/518 X |
| 4,603,774 | * | 8/1986 | Siwersson et al. | 198/518 X |
| 4,793,467 | * | 12/1988 | Johansson et al. | 198/518 X |
| 4,903,821 | * | 2/1990 | Yamaguchi | 198/671 X |
| 5,626,218 | * | 5/1997 | Kamiwaki | 198/518 X |
| 5,845,762 | * | 12/1998 | Stark | 198/550.1 X |

FOREIGN PATENT DOCUMENTS

| | | |
|---|---|---|
| 483354 | 12/1969 | (CH) . |
| 8704996 | 8/1987 | (WO) . |

* cited by examiner

*Primary Examiner*—Christopher P. Ellis
*Assistant Examiner*—Gene O. Crawford
(74) *Attorney, Agent, or Firm*—Browdy and Neimark

(57) ABSTRACT

A screw conveyor for loose material comprises a tubular casing having a first part which is axially rotatable on command with respect to a second part. The first part is provided with openings through which the material can be introduced into the casing. A screw, internal of and coaxial to the casing, can rotate on command about its own axis and thus convey the material. A helical conveyor device which is solid in rotation with said first part of the casing, conveys the material towards the openings in first part of the casing. There is a hollow jacket between the conveyor device and the second part of the casing, through which the material passes. The invention provides greater efficiency in collecting and removing loose material from a pile.

7 Claims, 2 Drawing Sheets

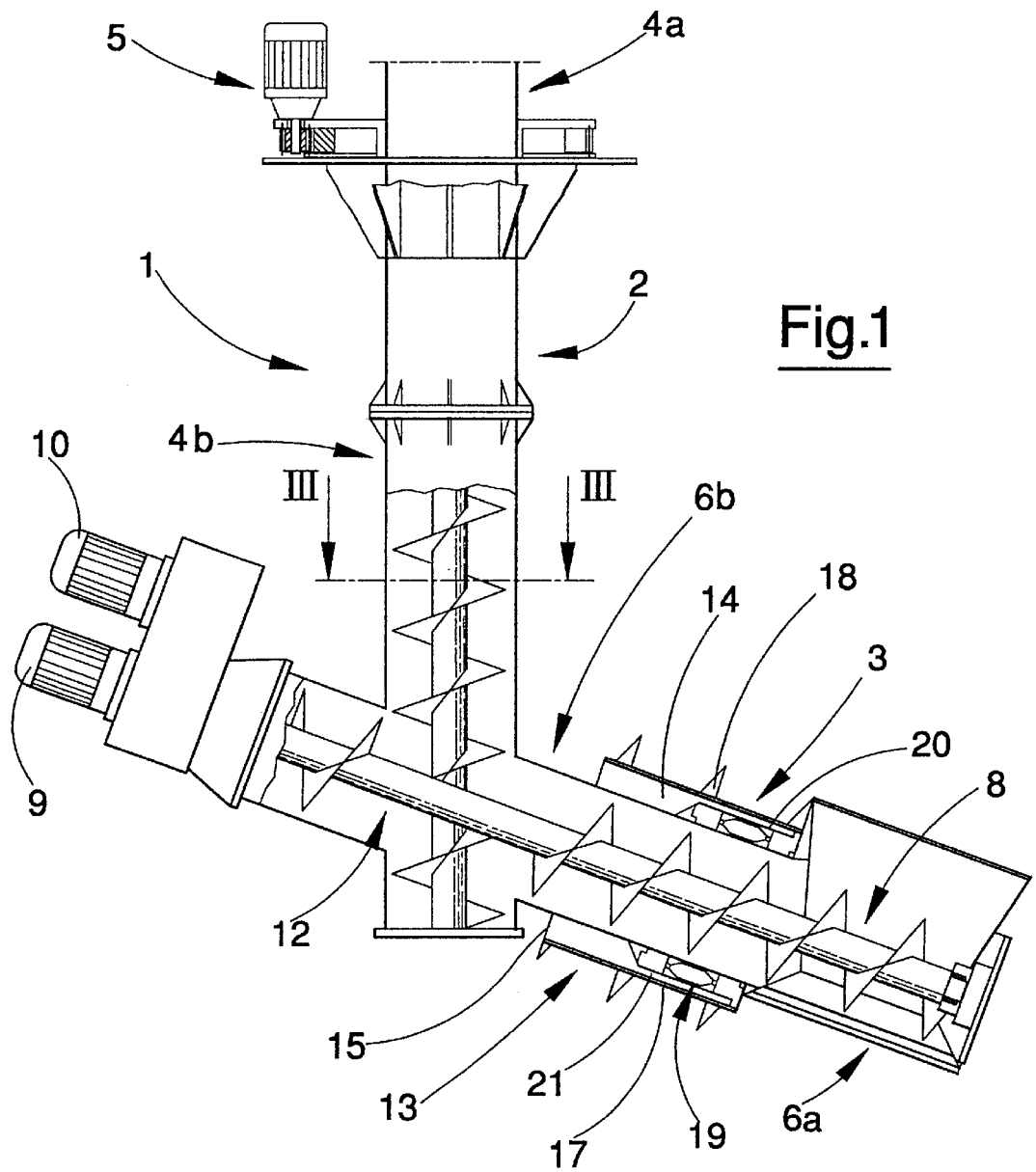
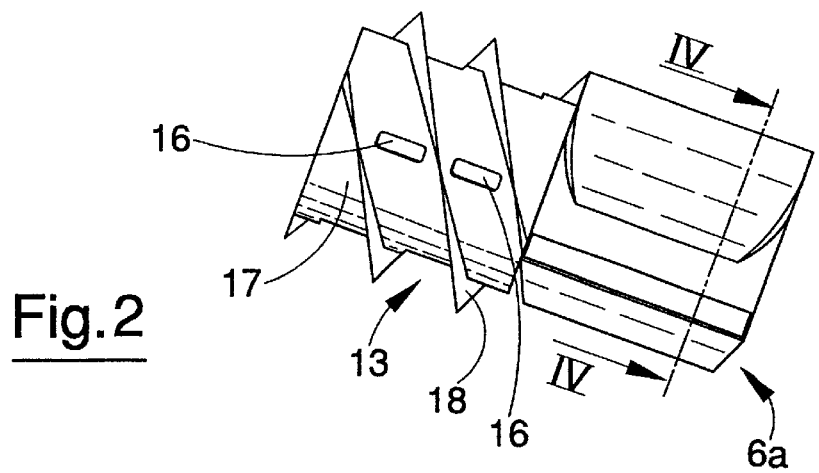

SCREW CONVEYOR FOR LOOSE MATERIALS

BACKGROUND OF THE INVENTION

Specifically, though not exclusively, the invention can be advantageously used for collecting loose material in granule or powder form from a store and convey it elsewhere. A typical example of application of the invention is in transporting loose granules or powder material from a collection hopper or a ship's hold.

The present invention specifically relates to a device comprising a tubular outer protection casing, having a first part which is axially rotatable on command with respect to a second part, in which the first part is provided with at least one opening through which the material can be introduced into the casing. A screw spiral, located inside the casing and being coaxial thereto, can rotate on command about its own axis and thus transport the material in a parallel direction to the axis of the screw itself.

A screw conveyor of this type is known, for example from Italian patent IT 1,269,273.

The prior art further teaches a screw conveyor for collecting loose material from a store, having one end for inlet of material which during use is sunk into the store of loose material. The inlet end exhibits a free length of screw which projects axially from the casing and which operates on the material to force it to enter the inlet end.

Also known is a transporter which comprises, instead of the free length of screw, a screw which is destined to be buried in the pile of loose material to be conveyed. The external screw is coaxial with respect to the screw operating internally of the casing, and is commanded to rotate in an opposite direction to that of the internal screw. The external screw transfers the material towards the inlet end of the casing, where the material itself can be drawn into the internal screw.

The known conveyors as described above all have a relatively poor performance, especially as regards their efficiency in actually collecting the loose materials from the pile.

SUMMARY OF THE INVENTION.

The main aim OF THE present invention is to obviate the above-mentioned drawback in the prior art by providing a device returning an especially high performance.

An advantage of the present invention is that it provides a particularly efficient device for collecting up the loose materials from the store pile.

A further advantage is that the invention provides a screw conveyor which is constructionally simple and economical and offers a high level of productivity. These aims and advantages and others besides are all achieved by the present invention, as it is characterised in the appended claims.

BRIEF DESCRIPTION OF THE DRAWINGS.

Further characteristics and advantages of the present invention will better emerge from the detailed description that follows of a preferred but non-exclusive embodiment of the invention, illustrated purely by way of non-limiting example in the accompanying figures of the drawings, in which:

FIG. 1 is a schematic view in vertical elevation of a part of an apparatus for conveying loose material comprising a screw conveyor made according to the invention;

FIG. 2 is a non-sectioned view of a detail of FIG. 1;

Figure 3:
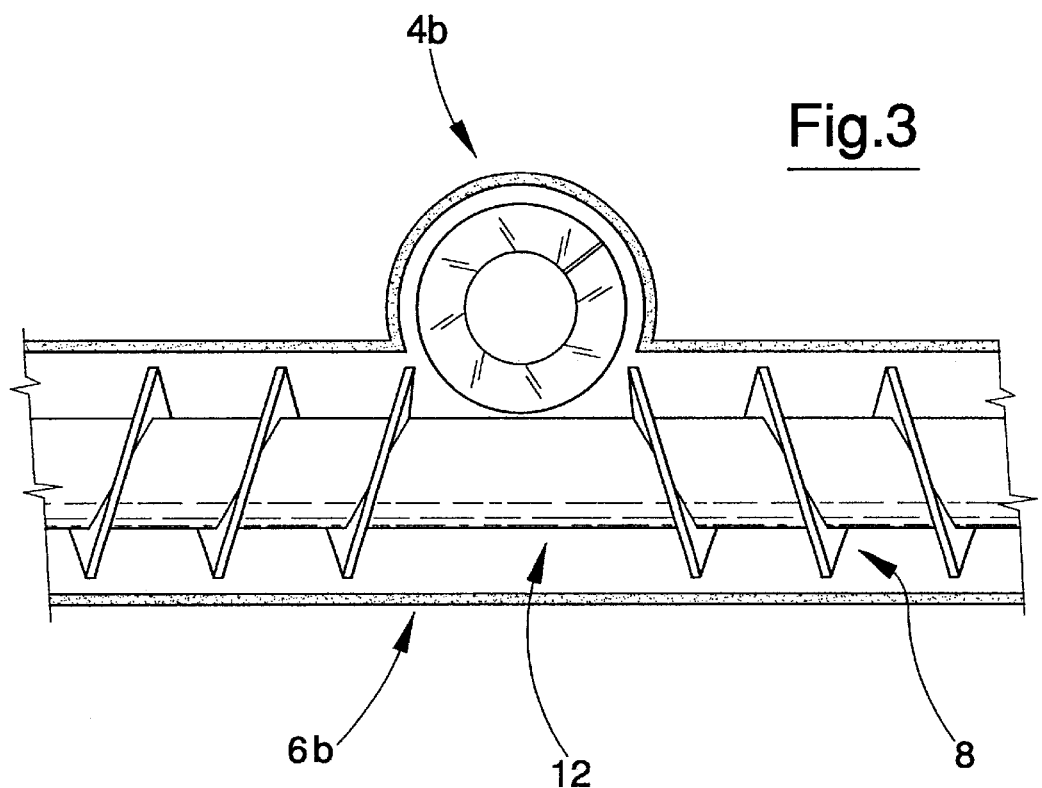
FIG. 3 is an enlarged-scale view of a section made according to line III—III of FIG. 1.
Figure 4:
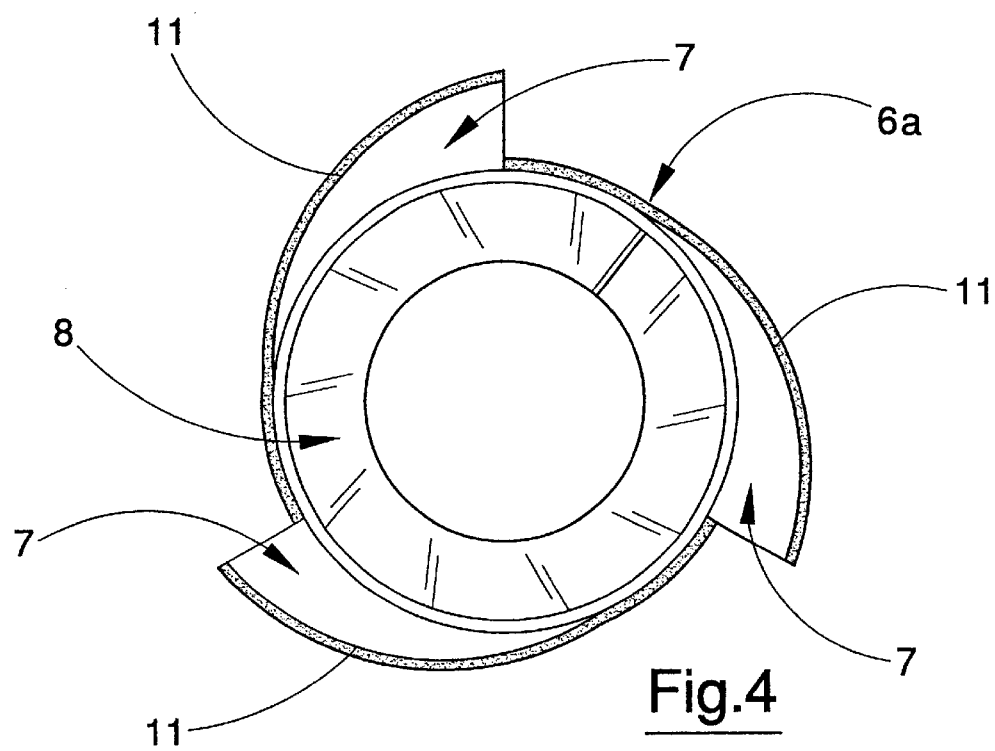
FIG. 4 is an enlarged-scale view of a section made according to line IV—IV of FIG. 1.

DESCRIPTION OF THE PREFERRED EMBODIMENTS.

With reference to the above-mentioned figures, 1 denotes in its entirety an apparatus for conveying loose materials, in granular or powder form (for example, cereals or granary produce in general) collected in a pile or store.

The apparatus 1 comprises a lift conveyor 2 for raising the material, preferably of the screw-type, having an axis x—x which is substantially vertical, which is inferiorly coupled with a lower screw conveyor 3 of the type described in the invention having an inclined axis y—y, the lower conveyor 3 is responsible for removing the material from the pile. The lower conveyor 3 extracts the material from the pile and sends it on towards the lift conveyor 2 which in turn raises the material up to an upper discharge mouth (not illustrated).

The lift conveyor 2 has a tubular casing inside which a conveyor screw is coaxially rotatable on command. The casing has a fixed upper part 4a and a lower mobile part 4b which can rotate about its own longitudinal axis x—x and is driven by a motor 5 which is solidly constrained on the fixed part 4a of the casing. The lower conveyor 3 is solidly constrained to the lower rotatable part 4b of the casing of the lift conveyor 2. The lower conveyor 3 can thus be rotated about the vertical axis x—x of the lift conveyor 2 so that it can collect the material more efficiently from the pile.

The lower conveyor 3 comprises a tubular casing with a longitudinal axis y—y which is arranged obliquely in order better to sink into the pile of loose material. The casing has a lower first part 6a which is axially rotatable on command about an upper second part 6b, solidly constrained to the lower rotating part 4b of the casing of the lifting conveyor 2. The rotatable first part 6a is provided with at least one opening 7 through which the material can be introduced internally of the casing. The lower screw conveyor 3 comprises a screw 8 which is internal and coaxial to the casing and able on command to rotate about its own axis, transporting the material in a parallel direction to the axis of the screw itself. The lower part 6a of the casing is driven in rotation by a first gear reducer 9 fixed to an upper end of the casing and aligned with the axis of the casing itself. A second gear reducer 10 is constrained to the same end and has an axis which is parallel to the axis of the casing. The second gear reducer 10 drives the screw of the lower conveyor 3.

The screw 8 is wound about a shaft which has an upper end rotatably coupled to a head which is solidly constrained to the upper part of the casing. A lower end of the shaft is rotatably coupled to an internal coaxial shaft by means of a flange constrained to the shaft.

The first gear reducer 9, fixed to the head, is directly coupled to the internal coaxial shaft and drives, through the flange, the rotatable part 6a of the casing which has a lower end fixed to the flange itself. The second gear reducer 10, also fixed to the head, drives the shaft of the screw 8 by means of gearings. This combination of elements enables a rotary drive to be transmitted to the lower part 6a of the casing of the lower conveyor 3, which rotary drive is independent of the motion of the shaft of the screw 8, giving a wide choice of relative rotation speeds.

The rotating lower part 6a of the casing is peripherally provided with angularly equidistanced openings 7. In the illustrated example, there are three openings 7 distributed at 120° intervals. At each opening 7 there is preferably a concave wing 11 projecting from the casing, which can be volute- or spoon-shaped and terminates in a mouth lying in a radial plane with respect to the axis of the casing. The wings 11 have the task of facilitating the collection and transfer of the material in the casing through the relative peripheral openings 7. The mouths of the wings 11 are positioned such as to receive the material during the rotation of the mobile lower part 6a of the casing.

The screw 8 of the lower conveyor 3 is interrupted at the coupling zone 12 with the lower part 4b of the lift conveyor 2 and the upper part 6b of the casing of the lower conveyor 3, so as to avoid interference between the relative screws (see FIG. 3).

The tract of the shaft of the lower conveyor 3 comprised between the coupling zone 12 of the casings and the upper end of the lower conveyor 3 is provided with a screw having an opposite angle of inclination to that of the screw provided on an end of the shaft nearer the pile of material to be conveyed.

Thus both the lower screw and the upper tract of screw in effect collaborate to convey the material towards the coupling zone 12 between the lower and the upper (lift) conveyor casings. In this way a kind of compression chamber is created in the zone where the two casings meet. By effect of the collaboration between the two coaxial tracts of screw 8 with opposite inclinations, this compression chamber is completely filled to facilitate the work of the lift conveyor 2 screw.

The lower conveyor 3 comprises a conveyor device 13 for transporting the material from the pile towards the inlet openings 7 situated on the rotatable first part 6a of the casing. The conveyor device 13 is solid in rotation with the first rotatable part of the casing. The conveyor device 13 is predisposed externally of the second part 6b of the casing in such a way as coaxially to surround and cover. at least partially, the second part 6b.

Between the conveyor device 13 and the second part 6b of the casing there is an empty zone or annular jacket 14 which on an opposite side to the first part of the casing 6a has at least one end opening 15 through which the material in the pile can enter the jacket 14. This end opening 15 is preferably annular and lies on a perpendicular plane with respect to the axis of the lower conveyor 3. The jacket 14 is further provided with one or more lateral openings 16 distributed between the end opening 15 and the openings 7 through which the material enters the casing. The lateral openings 16 place the jacket 14 in communication with the outside and thus with the material in the pile. Each lateral opening 16 faces substantially external wise in a radial direction with respect to the lower conveyor 3. In other words, the lie plane of the openings 16 is substantially perpendicular with respect to a radial direction. The material in the pile can pass either in exit or in entrance, through the lateral openings 16 of the jacket 14.

The material in the pile can circulate through the jacket 14, prevalently entering through the end opening 15 in an axial direction and exiting through the intermediate lateral openings 16, in a substantially radial direction.

In the illustrated example the conveyor device 13 comprises a tubular wall 17 which coaxially surrounds a tract of the second part 6b of the casing. The jacket 14 is defined between the tubular wall 17 and the tract of the second part 6b of the casing. The tubular wall 17 exhibits a lower end which is solidly constrained to an upper end of the rotatable first part 6a of the casing, while the upper end of the tubular wall 17 is free. The end opening 15 of the jacket 14 is externally delimited by the upper free end of the tubular wall 17. At least one helical surface 18 is provided externally of the tubular wall 17, which helical surface 18 interacts contactingly with the material in the pile. The helical surface 18 is coaxial and solidly connected to the tubular wall 17. The lateral openings 16 for the radial passage of the material are afforded in the tubular wall 17 in zones comprised between consecutive coils of the helical surface 18.

Between the tubular wall and the second part 6b of the casing bearings 19 are provided for supporting the rotation of the wall 17 which bearings 19 are protected and insulated from the material by seals. The sealed bearings 19 and the seals are located in proximity of the lower end of the tubular wall 17. The bearings occupy a zone of the jacket 14, in particular the zone closest to the rotatable part 6a of the casing and opposite with respect to the annular end opening 15 of the jacket 14.

Preferably the external diameter of the sealed bearings 19 operating between the casing of the lower conveyor 3 and the conveyor device 13 is smaller than the internal diameter of the tubular wall 17 on which the helical surface 18 acting on the material is wound. The conveyor device 13 is provided with a coaxial second tubular wall 20 which is internal, solidly connected to and axially shorter than the tubular wall 17 on which the helical surface 18 is externally wound. The sealed bearings 19 operate between the casing of the lower conveyor 3 and the second tubular wall 20 of the conveyor device 13.

Between the internal second tubular wall 20, internally of which the sealed bearings 19 are coupled, and the external tubular wall 17, externally of which the helical surface 18 is coupled, there is a narrow jacket 21. In this way the empty space comprised between the casing and the lower conveyor 3 and the conveyor device 13 extends for practically the whole length of the device, including the lower tract where the sealed bearings 19 are located. In other words, the jacket 14 comprised between the conveyor device 13 and the casing of the lower conveyor 3 continues, though becoming extremely slim into the narrow jacket 21, i.e. into a zone comprised between the conveyor device 13 and the sealed bearings 19. The loose material coming from the pile can circulate in the narrow free annular space situated radially externally of the means for supporting and sealing 19 and internally of the conveyor device 13.

The conveyor device 13 exhibits, at the free space, at least one opening 16 placing the free space itself in communication with the outside of the device. During operation, the inclined-axis lower conveyor 3 is sunk, at its lower end (which is provided with the inlet opening 7) into the loose material in the pile.

The screw 8 internal of the casing is set in rotation at the same time as the rotatable lower part 6a of the casing. The two above-mentioned rotations are actuated by separate and independent motors 9 and 10. Consequently the conveyor device 13 rotates solidly with the lower part 6a of the casing to draw the loose material towards the inlet openings 7 of the casing until the material is taken up by the conveyor screw 8.

Experiments have shown that the transport of the material towards the inlet of the casing is facilitated thanks to the presence of an empty zone, internal of the conveyor device 13 and comprised between the device itself and the casing of the lower conveyor 3, in which zone the material can circulate. During operation a part of the material in the pile enters axially into the jackets 14 and 21 through the axis end opening 15, and exits radially through the peripheral openings 16, which results in an improved collection capacity of the conveyor.

What is claimed is:

1. A screw conveyor for loose material, comprising:
   a tubular casing having a first part which is axially rotatable on command with respect to a second part, said first part being provided with at least one opening through which the loose material can be introduced into the casing;
   a screw, internal of and coaxial to the casing and able to rotate on command about an own axis, for conveying the material in a parallel direction to said own axis of said screw;
   a conveyor device which is. solid in rotation with said first part of the casing which conveyor device is able to convey the material towards said at least one opening in said first part of the casing, said conveyor device having a tubular wall external and coaxial to the second part of the casing;
   a jacket between said tubular wall and said second part of the casing through which the material can pass;
      wherein the tubular wall and the second part of the casing are provided with bearings for supporting the tubular wall during rotation around said second part of the casing;
      wherein the bearings are protected and insulated from the material by seals.

2. The conveyor of claim 1, wherein said jacket exhibits on an end opposite to said first part of the casing, at least a first end opening for passage of the material.

3. The conveyor of claim 1, wherein said conveyor device comprises at least one helical surface, interacting with the material and being wound about an external side of said tubular wall and being coaxial and solidly connected to said tubular wall.

4. The conveyor of claim 1, wherein said tubular wall exhibits at least one lateral opening for passage of the material.

5. The conveyor of claim 4, wherein said conveyor device comprises at least one helical surface interacting with the material and being wound about an external side of said tubular wall, and being coaxial and solidly connected to said tubular wall, lateral openings being afforded in said tubular wall and being situated between at least two consecutive coals of said helical surface.

6. A plant for conveying loose material comprising a plurality of screw conveyors connected in series, wherein the plant comprises at least a first screw conveyor comprising:
   a tubular casing having a first part which is axially rotatable on command with respect to a second part, said first part being provided with at least one opening through which the loose material can be introduced into the casing;
   a screw, internal of and coaxial to the casing and able to rotate on command about an own axis, for conveying the material in a parallel direction to said own axis of said screw;
   a conveyor device which is solid in rotation with said first part of the casing which conveyor device is able to convey the material towards said at least one opening in said first part of the casing, said conveyor device having a tubular wall external and coaxial to the second part of the casing;
   a jacket between said tubular wall and said second part of the casing, through which the material can pass;
      wherein the tubular wall and the second part of the casing are provided with bearings for supporting the tubular wall during rotation around said second part of the casing;
      wherein the bearings are protected and insulated from the material by seals.

7. The plant of claim 6, comprising a second lift conveyor having a vertical axis which is inferiorly coupled to a lower conveyor which is said first screw conveyor;
   wherein the lower conveyor collects loose material from a pile of material and has an axis which is inclined with respect to said lift conveyor,
   said lower conveyor being able to rotate on command about the vertical axis of the lift conveyor.

* * * * *